W. M. DAVIS.
HYDRAULIC TRANSMISSION MECHANISM.
APPLICATION FILED JULY 12, 1915.

1,274,391.

Patented Aug. 6, 1918.
3 SHEETS—SHEET 2.

INVENTOR.
William M. Davis
By his attorneys
Putnam Putnam +Bell

W. M. DAVIS.
HYDRAULIC TRANSMISSION MECHANISM.
APPLICATION FILED JULY 12, 1915.

1,274,391.

Patented Aug. 6, 1918.
3 SHEETS—SHEET 3.

INVENTOR.
William M. Davis
By his attorney
Putnam Putnam & Bell

UNITED STATES PATENT OFFICE.

WILLIAM M. DAVIS, OF CAMBRIDGE, MASSACHUSETTS, ASSIGNOR OF ONE-EIGHTH TO RAYNOR M. GARDINER, OF BELMONT, MASSACHUSETTS, ONE-EIGHTH TO WILMER D. HEMMING, OF COLORADO SPRINGS, COLORADO, AND ONE-FOURTH TO RAYNOR M. GARDINER AS EXECUTOR OF CARL CHADWICK, DECEASED.

HYDRAULIC TRANSMISSION MECHANISM.

1,274,391.           Specification of Letters Patent.     Patented Aug. 6, 1918.

Application filed July 12, 1915. Serial No. 39,314.

*To all whom it may concern:*

Be it known that I, WILLIAM M. DAVIS, a citizen of the United States, residing at Cambridge, in the county of Middlesex and State of Massachusetts, have invented certain Improvements in Hydraulic Transmission Mechanism, of which the following description, in connection with the accompanying drawings, is a specification, like reference characters on the drawings indicating like parts in the several figures.

This invention relates to hydraulic transmission mechanisms of the character designed to be used in driving machine tools, automobiles, or other apparatus or machinery in which it is desired to transmit power from a driving to a driven member and to provide for varying the speed of the driven member.

While many mechanisms of this general character have been proposed heretofore, these mechanisms have gone into practical use to a very limited extent only, due chiefly to the fact that most of the designs heretofore proposed have been found to be very inefficient, particularly at high speeds, and also to the fact that such mechanisms as heretofore constructed have been very large and cumbersome and so complicated that they were subject to rapid wear and deterioration.

The present invention aims to devise a mechanism of this character in which these objections shall be overcome, and is particularly directed to simplifying the construction of mechanisms of this character, to reducing the losses due to friction, and to producing a compact, efficient and thoroughly practical transmission mechanism of this type.

Referring now to the accompanying drawings,

Fig. 5 is a perspective view of a detail of the valve mechanism.

Figure 1:
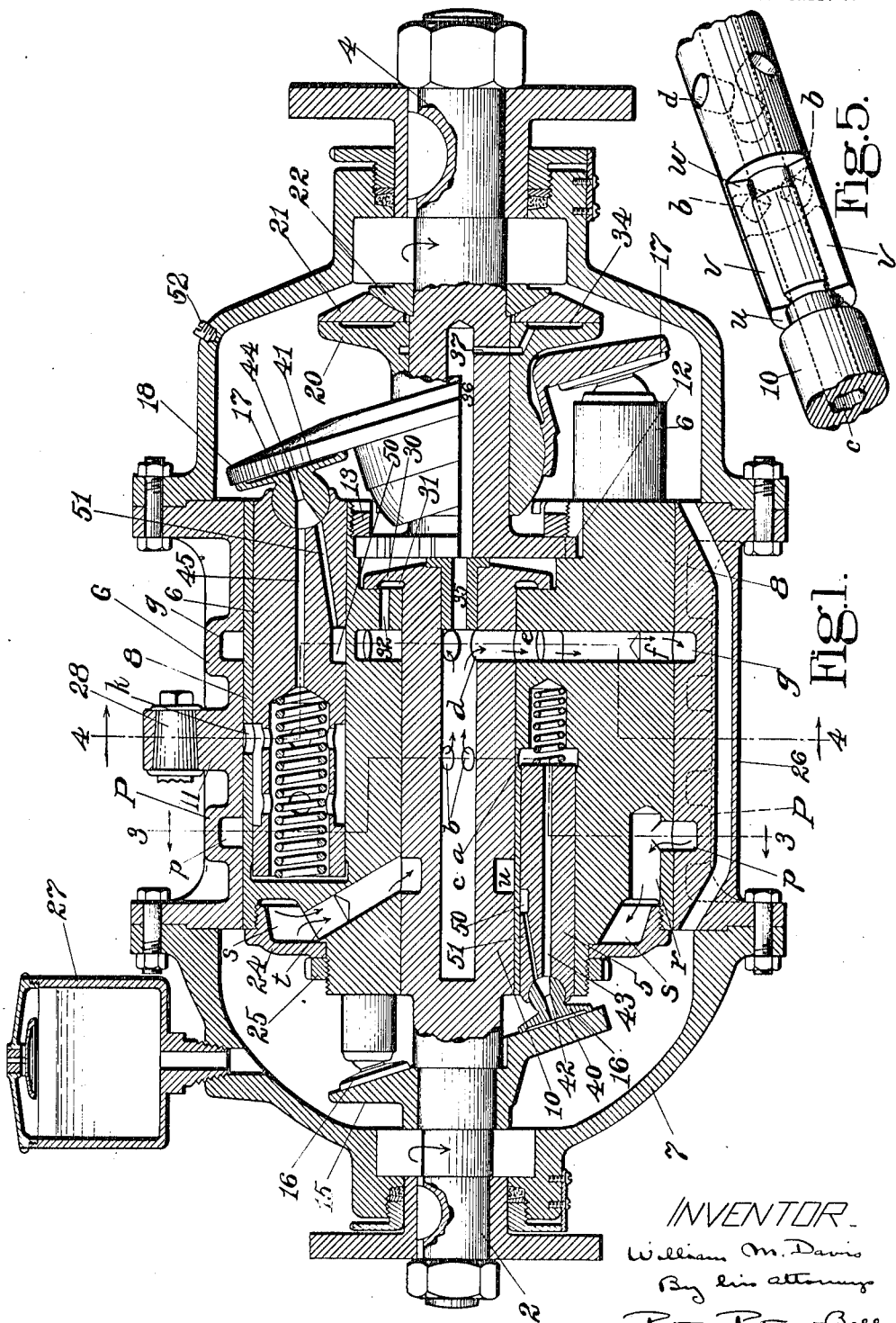
Figure 1 is a central, longitudinal, sectional view through a mechanism embodying this invention.

Briefly stated, the mechanism comprises a driving shaft 2, a driven shaft 4, a pump of the reciprocating piston type driven by said shaft 2 and including a series of pistons 5, and a motor, also of the reciprocating piston type, and including a series of pistons 6. The motor is driven by the liquid set in motion by the pump and, in turn, drives the driven shaft 4. An outer casing 7 incloses the moving parts of the mechanism.

The pump and motor pistons preferably are arranged in two circular series concentric with the shaft 2, one series lying inside or closer to the shaft than the other. The two series of cylinders in which the respective pump and motor pistons work are formed in a barrel 8 which is mounted to rotate in the casing 7 and is co-axial with the shafts 2 and 4. Both the pump and motor cylinders lie parallel to the axis of the barrel and they extend in opposite directions, that is, the pump cylinders extend into the barrel from its left hand end, Fig. 1, and the motor cylinders extend inwardly from the right hand end of the barrel. An extension 10 of the driving shaft 2 projects into a bore formed for it in the center of the barrel 8 and is constructed to form a central distributing valve for the pump while the casing 7 in which the barrel revolves is constructed to form an outer distributing valve for the mechanism. The barrel, of course, has suitable ports or passages arranged to coöperate with the valve mechanism to provide for the desired flow of oil to and from the pump and motor cylinders.

The barrel 8 has a rotary motion independent of the driving shaft 2 but is keyed to the inner end of the driven shaft 4 so that it rotates with the latter shaft. For this purpose the inner end of the shaft 4 is provided with a flange 12 having suitable projections or tongues formed around its periphery which extend into corresponding slots in the barrel. This flange is clamped in the barrel by a nut 13.

The pump comprises a cam plate 15 which is mounted fast on the driving shaft 2 and is provided with a plain cam face that is inclined to the axis of rotation of the shaft. The pistons 5 carry a series of members 16, which for convenience may be designated as "shoes," one of said shoes being mounted on each piston, and each shoe has a face that bears against the cam face of the plate 15 and also has a ball and socket connection with its respective piston. This construction is clearly shown in Fig. 1. It will be evident from an inspection of this figure that, as the shaft 2 and the cam plate 15 are rotated, the series of pump pistons 5 will be reciprocated in their cylinders in the barrel 8.

Figure 2:
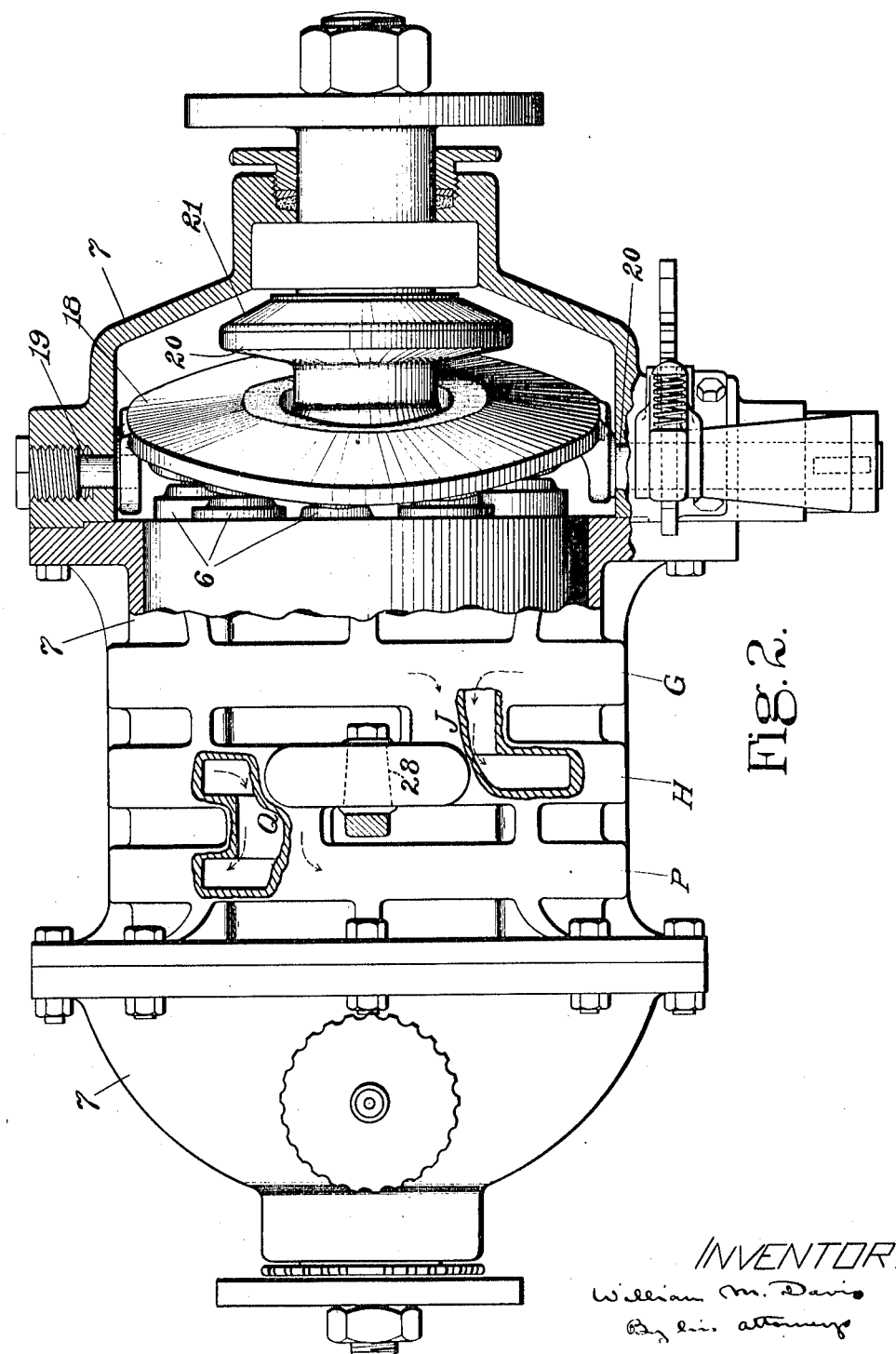
Fig. 2 is a view, partly in side elevation and partly in cross section, on a plane at right angles to the view shown in Fig. 1.

The motor construction is similar to that of the pump, each of the motor pistons 6 carrying a shoe 17 corresponding to the shoes 16, and arranged to bear against the plane face of a cam plate 18 similar to the cam plate 15. The plate 18, however, is stationary in the casing 7 but is mounted on two pivots 19 and 20, respectively, (Fig. 2) so that its angularity can be varied with reference to the axis of the barrel. A handle connected to the pivot 20 of the cam plate 18 and coöperating with some convenient means for holding it in different positions of adjustment, is provided for the purpose of retaining the cam plate 18 in any desired angular position in the casing. This plate is partly supported also on the ball end of a member 20 which is mounted on the shaft 4 and bears against a thrust plate 21 that is backed up by another thrust member 22, the member 21 preferably having a concave face bearing against a convex face on the member 22 so that the parts can adjust themselves to minor inaccuracies in alinement. Any suitable fluid medium may be used in the mechanism but oil ordinarily is employed.

Figure 3:
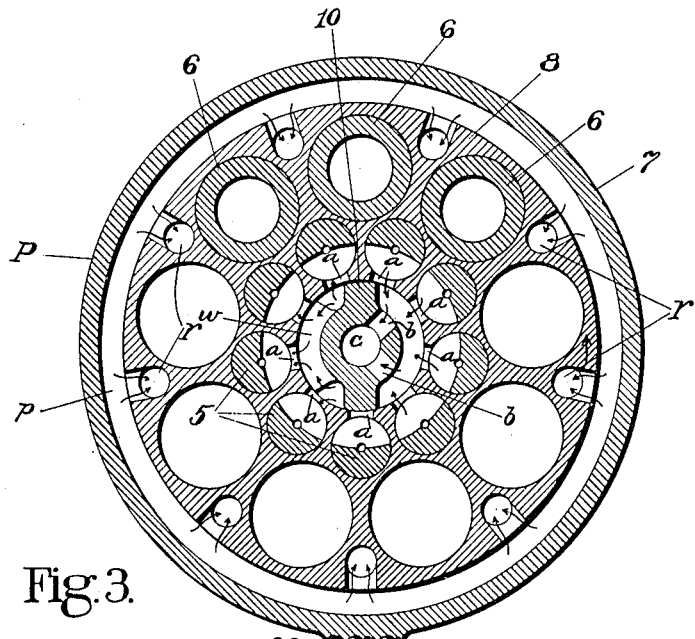
Fig. 3 is a transverse sectional view on the line 3—3, Fig. 1.
Figure 4:
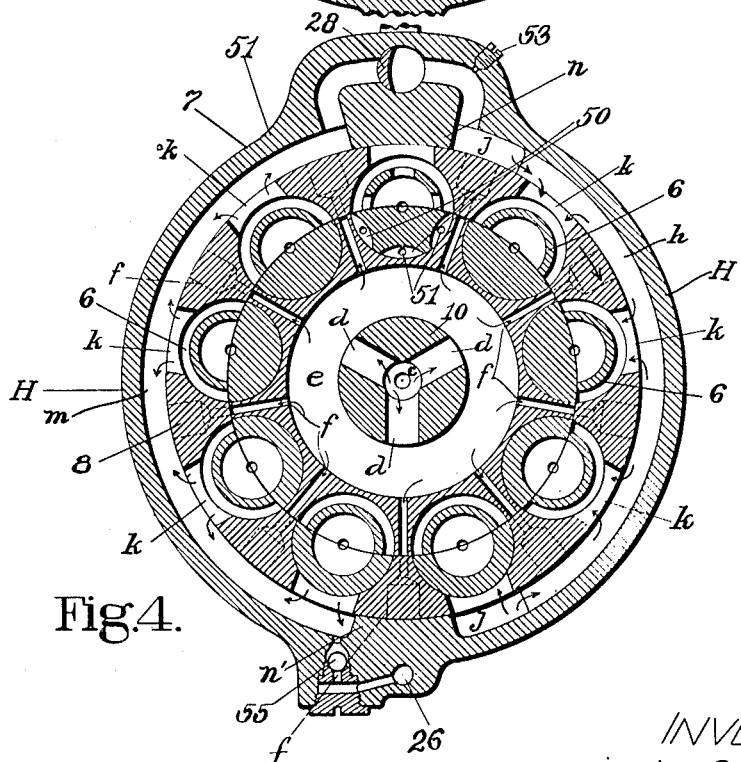
Fig. 4 is another transverse, sectional view on the line 4—4, Fig. 1.

The circulation of oil through the mechanism will now be explained, it being borne in mind that the pump pistons back of the plane on which Fig. 1 is taken, that is, those at the right hand side of Fig. 3, are forcing oil out of their chambers while the pump cylinders in front of said plane and at the left hand side of Fig. 3 are taking in oil. Similarly, the motor pistons back of the plane of Fig. 1 and at the left hand side of Fig. 4 are expelling oil while the motor cylinders in front of said plane and at the right hand side of Fig. 4 are taking in oil. The oil expelled by the right hand set of piston 5 (Fig. 3) which at this instant are pumping, is forced through the pump ports $a$ into the bore at the center of the barrel 8 and through the ports $b$ in the valve into the central passage $c$ of the valve from which it escapes through any one of three radial ports $d$ (see Figs. 1 and 4) into an annular space $e$ formed in the barrel 8. A series of small ports $f$, best shown in Fig. 4, permit the oil to flow from the space $e$ through the wall of the barrel 8 into an annular space $g$ formed about the periphery of the barrel in a circumferential ridge or enlargement G of the casing 7. Another circumferential ridge H is formed adjacent to the ridge G and the part H has formed in it a channel $h$ that extends nearly half way around the periphery of the barrel 8, (see Fig. 4) and communicates with the channel $g$ through two lateral ports J formed in the casing. From this channel $h$ the oil flows to the motor cylinders through the ports $k$.

The oil pressure on the right hand set of motor pistons shown in Fig. 4 will tend to push these pistons out of their cylinders. Considering for a moment the upper piston 6 shown in Fig. 1, it will be evident that the outward movement of this piston can only be effected, so long as the cam plate 18 remains stationary, by rotating the barrel 8 around its axis so as to allow the member 17 to move from the upper part of the cam face where it is close to the barrel to the lower part of the cam face which is farther away from the barrel. Consequently, the right hand set of pistons shown in Fig. 4 will force their respective members 17 to slide down the face of the cam 18 and thus will rotate the barrel 8. This rotary motion will be imparted to the driving shaft 4. While these members 17 are sliding down one side of the cam plate 18 and the energy developed by the pressure of the oil against the pistons 6 is thus being converted into rotary motion of the barrel 8 and the parts driven thereby, the members 17 on the opposite side of the axis of the barrel are sliding up the incline of the cam plate 18, thus pushing their pistons 6 into their cylinders and forcing oil out of the ports $k$ on the left hand side of the barrel as it appears in Fig. 4. This oil flows into a channel $m$ corresponding to the channel $h$ and formed in the part of the circumferential ridge or enlargement H that is opposite the channel $h$, these two channels being separated by wall pieces $n$ and $n'$, Fig. 4. The channel $m$ is in communication through two lateral ports Q, (see Fig. 2) similar to the ports J, with an annular chamber $p$ formed in another circumferential ridge or enlargement P that extends around the casing 7. The oil flowing into this channel next passes through a series of short ports $r$ formed in the barrel 8 in a direction parallel to its axis and enters an annular chamber $s$ (see Fig. 1), which is formed between the end of the barrel 8 and a member 24 that is threaded on to said end and is locked thereon by a nut 25, also threaded on the barrel. A series of small ports $t$, Fig. 1, lead from this chamber $s$ into the bore of the barrel 8, entering said bore at a point opposite an annular groove $u$ formed in the valve 10. This groove is connected by two channels $v$ to a port $w$ formed in the valve 10 at a point opposite the ports *b* so that the oil traveling through the course just described is delivered to the ports *a* of the pump pistons 5 on the left hand side of the barrel as shown in Fig. 3. Since the pistons on this side of the barrel are moving outwardly, that is, are making their intake stroke, their cylinders will be filled with oil which will be discharged again as soon as they have moved into communication with the chamber *b* in the opposite side of the distributing valve 10.

If now the driving shaft 2 is being driven at a constant speed, thus producing a certain speed of the driven shaft 4, and it is desired to increase the speed of the shaft 4, it is merely necessary to adjust the cam plate 18 to a position more nearly at right angles to the axis of the shaft 4. This obviously will have the effect of reducing the stroke of the motor pistons 6 but since the pump continues to deliver the same quantity of oil as before the motor can handle this quantity of oil only by making a larger number of strokes than before, and this result can only be accomplished by rotating the barrel 8 (and consequently the shaft 4) at an increased speed.

By adjusting the cam plate 18 at exactly right angles to the shaft 4, the capacity of the motor is reduced to zero. Consequently, the pump can deliver no oil at this time since the flow of oil is stopped and the pump and motor thus are locked together through the body of oil and the barrel 8 and shaft 4 are compelled to revolve at the same speed as the driving shaft 2. In other words, at this time the drive is direct between the shafts 2 and 4. If the cam plate 18 were adjusted still farther so that its angle of inclination was opposite to that shown in Fig. 1, the direction of rotation of the barrel and the shaft 4 would be reversed.

It will be observed that the rate of flow of oil between the pump and motor reaches a maximum when the ratio of speed reduction between the driving and driven shafts is at a maximum and that this rate of flow decreases as the speed ratio approaches unity and becomes zero when the drive becomes direct, no oil whatever flowing at this time except that due to leakage. This arrangement is advantageous since, in most classes of machinery for which mechanisms of this kind are designed, as for instance in automobiles, the drive is direct during probably ninety per cent. or more of the time. A certain percentage of the power delivered to the mechanism by the driving shaft is, of course, absorbed in friction of the oil and of the moving parts of the mechanism. But this friction loss decreases as the speed ratio is reduced and consequently the mechanism attains its greatest efficiency under the conditions at which it is operated the greater part of the time. The elimination of the reciprocating motion of the pump and motor parts on direct drive also is an important practical advantage since it greatly reduces the wear of these parts and consequently increases substantially the life of the mechanism.

Preferably an oil connection 26 is provided between the chambers at the opposite ends of the barrel and a reservoir 27 is connected to one of these chambers to maintain an ample supply of oil in the mechanism.

A by-pass valve 28, arranged to be operated by hand, is mounted in a port connecting the chambers *h* and *m*. Under normal conditions this valve is kept closed but when it is opened it short circuits the flow of oil through the motor cylinders, allowing the oil which otherwise would flow into the motor ports, to flow from the channel *h* to the channels *m*, Q and *p* and back to the pump. The motor thus is rendered inoperative at this time, the shaft 4 stops rotating and the pump is relieved of its load, thus enabling the driving shaft to run freely.

In mechanisms of this character the oil pressures become very high and the pressures of certain of the moving parts on each other are severe. An important feature of this invention consists in neutralizing or counterbalancing the heavier and consequently the more important of these pressures by fluid pressures. It is obvious that there will be a heavy pressure exerted on the cam plate 15, tending to move the driving shaft 2 axially to the left, as shown in Fig. 1. This pressure is opposed by providing a flange 30 on the end of the extension 10 of the shaft 2 and positioning this flange against a shoulder on the barrel 8. The pressure between these two parts is substantially neutralized by providing in the friction surface of the flange 30 a pressure area or recess 31 and leading oil to this area by means of a duct 32 which connects it with the annular chamber *e* in the barrel 8. The area of the recess 31 is so proportioned with reference to the oil pressure to which it is subjected that the fluid pressure substantially balances the pressure tending to force the flange 30 against the end of the barrel. A similar pressure area 34 is provided between the bearing surfaces of the members 20 and 21 and oil is conducted to this area by means of ducts 35, 36 and 37 that lead to the central chamber *c* of the distributing valve 10. Similar pressure areas 40 and 41 are provided in each of the members 16 and 17 respectively, to relieve the pressure between the cam plates 15 and 18 and their coöperating sets of members 16 and 17, respectively. Two communicating ducts 42 and 43, formed in the respective members 16 and 5, connect each of the pressure areas 40 with the chambers in which the pistons 5 work;

and similar ducts 44 and 45, formed, respectively, through the members 17 and 6, connect the areas 41 with the supply of oil in the cylinders in which the pistons 6 work. The areas 40 are each made substantially equal to the area of the inner end of one of the pistons 5 so that the pressure on the surface 40 substantially balances the pressure on the end of the piston. Each area 41 also is made substantially equal to the effective area of one of the pistons 6. A spring 46 in each of the pump piston cylinders operates through its respective piston 5 to hold one of the members 16 against the face of the cam 15 and corresponding springs 47 in the motor piston cylinders perform a like function with regard to the members 17. The ducts that carry oil to the various pressure areas are, of course, made very small in diameter as it is unnecessary to deliver any substantial volume of oil but merely to transmit the hydrostatic pressure in order to equalize the mechanical forces, in the manner indicated.

It will be noted that the pump and motor constructions are very simple, the universal joints and ball bearings which generally have been used in mechanisms of this character being eliminated. While the rotary motion of the driving shaft is transformed into reciprocatory motion of the pump solely through sliding friction, and the motion of the motor pistons is similarly transformed into rotary motion of the driven shaft 4 solely through sliding friction, this friction is substantially eliminated by the oil cushions which are provided between the friction surfaces.

In pumps and motors of the type shown in the accompanying drawings, there is at certain times a tendency to crowd each piston against the side of the cylinder in which it works. In order to counteract this tendency, a pressure area 50 is formed in that side of each piston which is crowded against the wall of the cylinder and is connected by one or more ducts 51 with the chamber at the inner end of the piston. This area is sufficient to relieve the sidewise pressure of the piston against the wall of the cylinder in which it operates and thus reduces the friction between these surfaces. The motor pistons preferably are provided with a series of these areas 50 extending entirely around each piston, as best shown in Fig. 4, each of these areas being connected by a duct 51 with the chamber in which the piston works. These ducts open into the socket at the outer end of the piston, forming a circular series of holes lying around the axis of the piston as a center. As the ball end of the shoe or member 17 changes its position in its socket to accommodate itself to a change in the angle of the cam plate 18, it opens or closes the ends of certain of these ducts depending on the direction in which the adjustment is made, these parts being so proportioned and designed that the ball end of the shoe opens the ports leading to the pressure areas to which oil should be transmitted in order to counteract the side pressure on the piston at any instant. In other words, the parts 17 perform the functions of distributing valves in controlling the transmission of hydrostatic pressure to the various pressure areas 50 around each piston, permitting pressure to be transmitted only to the areas which should receive it. When the cam plate 18 is adjusted at right angles to the shaft 4, the ball end of each member 17 partly uncovers the ends of all the ducts 51, thus admitting oil to the entire circumferential series of pressure areas and causing the pressures around the piston to balance each other. At this time of course there is no tendency to crowd the piston to either side of its cylinder.

Vent plugs 52 and 53, see Figs. 1 and 4, are provided in the parts of the casing where air pockets otherwise would form in filling up the apparatus. It is impracticable to make the motors and pumps used in mechanisms of this character absolutely oil tight. Accordingly some leakage will take place from the high pressure side. In order to maintain the required quantity of oil in the circulating system a replenishing channel is provided, as shown at the bottom of Fig. 4, which allows oil to flow from the channel 26 to the suction side of the circulating system. A check valve 55 in this channel prevents the flow of oil in the opposite direction.

It is obvious that the mechanism is susceptible to many changes and modifications in the details of construction and in the general arrangement of parts while still maintaining the essential features of the invention, and such changes are regarded as coming within the scope of the invention.

Having thus described my invention, what I claim as new and desired to secure by Letters Patent of the United States is:

1. In a hydraulic transmission mechanism, the combination of a rotary shaft, a barrel fast on said shaft, a motor comprising a plurality of reciprocating pistons mounted in cylinders formed in said barrel, a driving shaft, a pump driven by said shaft and comprising a plurality of reciprocating pistons mounted in cylinders formed in said barrel, and valve means for controlling the flow of liquid between said pump and said motor.

2. In a hydraulic transmission mechanism, the combination of a rotary shaft, a barrel fast on said shaft, said barrel having two series of piston cylinders formed therein about the axis of rotation of the barrel, said cylinders lying parallel to said axis, a motor comprising a series of reciprocating pistons mounted in one series of said cylinders, a driving shaft, a pump driven by said shaft and comprising another series of reciprocating pistons mounted in the other series of cylinders in said barrel, and valve mechanism for controlling the flow of liquid between said pump and said motor.

3. In a hydraulic transmission mechanism, the combination of a rotary shaft, a barrel fast on said shaft, said barrel having two circular series of piston cylinders formed therein, each series being co-axial with the barrel and one series lying inside the other, said cylinders extending parallel to the axis of rotation of the barrel and being formed in opposite ends of said barrel, a motor comprising a series of reciprocating pistons mounted in one series of said cylinders, a driving shaft, a pump driven by said shaft and comprising another series of reciprocating pistons mounted in the other series of cylinders in said barrel, and valve mechanism for controlling the flow of liquid between said pump and said motor.

4. In a hydraulic transmission mechanism, the combination of a rotary shaft, a barrel fast on said shaft, said barrel having two series of piston cylinders formed therein about the axis of rotation of the barrel, said cylinders lying parallel to said axis, a motor comprising a series of reciprocating pistons mounted in one series of said cylinders, a driving shaft, a pump driven by said shaft and comprising another series of reciprocating pistons mounted in the other series of cylinders in said barrel, a central valve in said barrel, and an additional valve at the periphery of said barrel, said valves being constructed and arranged to control the flow of liquid between said pump and said motor.

5. In a hydraulic transmission mechanism, the combination of a rotary shaft, a barrel fast on said shaft, said barrel having two circular series of piston cylinders formed therein, each series being concentric with the barrel and said cylinders extending parallel to the axis of rotation of the barrel, a motor comprising a series of reciprocating pistons mounted in one series of said cylinders, a driving shaft, a pump driven by said shaft and comprising another series of reciprocating pistons mounted in the other series of cylinders formed in said barrel, said driving shaft being extended into said barrel and constructed to form a central distributing valve for the mechanism, and a casing in which said barrel revolves, said casing being shaped and constructed to form an outer distributing valve for the mechanism.

6. In a hydraulic transmission mechanism, the combination of a rotary shaft, a barrel fast on said shaft, said barrel having two circular series of piston cylinders formed therein, each series being concentric with the barrel and one series lying inside the other, said cylinders extending parallel to the axis of rotation of the barrel and being formed in opposite ends of the barrel, a motor comprising a series of reciprocating pistons mounted in one series of said cylinders, a driving shaft, a pump driven by said shaft and comprising another series of reciprocating pistons mounted in the other series of cylinders formed in said barrel, said driving shaft being extended into said barrel and constructed to form a central distributing valve for the mechanism, a casing in which said barrel revolves, said casing being shaped and constructed to form an outer distributing valve for the mechanism, and a by-pass valve in said casing having ports leading therefrom and coöperating with the ports of the other valves to short circuit the flow of liquid through the motor when open and thus to render the motor inoperative.

7. In a hydraulic transmission mechanism, the combination with a casing, of a barrel mounted to rotate in said casing, said barrel having two concentric series of piston cylinders, each cylinder extending parallel to the axis of rotation of the barrel, two sets of pistons mounted, respectively, in said series of cylinders for reciprocating movement therein, a driving shaft extending into said casing, means intermediate said shaft and one set of said pistons for causing the pistons to reciprocate in their cylinders when the shaft is revolved relatively to the barrel, a driven shaft fast with said barrel, an adjustable cam plate mounted in said casing, connecting means between said cam plate and the other set of pistons enabling said plate to control the extent of reciprocating movement of the latter set of pistons, and valve mechanism for controlling the flow of liquid between the two series of cylinders.

8. In a hydraulic transmission mechanism, the combination of a rotary shaft, a barrel fast on said shaft, said barrel having two circular series of piston cylinders formed therein, each series being co-axial with the barrel and one series lying inside the other, said cylinders extending parallel to the axis of rotation of the barrel and being formed in opposite ends of said barrel, a casing in which said barrel is rotatably mounted, a driving shaft extending into said casing and having an extension projecting axially into the barrel and forming a central distributing valve for the mechanism, a cam plate fast on said shaft, a series of reciprocating pistons mounted in one series of said cylinders and arranged to be operated by said cam plate, a stationary adjustable cam plate mounted in said casing, a second series of pistons mounted in the other of said series of cylinders and arranged to be controlled in their reciprocating movements by said adjustable cam plate, means for adjusting said cam plate, and a second distributing valve formed in said casing, said barrel having ports coöperating with said valves, whereby the valves are enabled to control the flow of liquid between the cylinders.

9. In a hydraulic transmission mechanism of the character described, the combination of a casing, a barrel rotatably mounted in said casing and having a plurality of piston cylinders formed therein, each cylinder extending parallel to the axis of rotation of said barrel, a plurality of pistons carried by said barrel, one in each of said cylinders, a rotatable shaft extending into said casing, a cam plate mounted adjacent to the ends of said pistons and rotatable with said shaft, and a plurality of members mounted on said pistons, one on each piston, and each having a flat surface bearing against said cam plate, each of said members having a ball and socket connection with its respective piston.

10. In a hydraulic transmission mechanism of the character described, a barrel having a plurality of piston cylinders formed therein, a plurality of pistons carried by said barrel, one in each of said cylinders, a cam plate mounted adjacent to said pistons, said barrel and cam plate being mounted for relative rotation and said cylinders extending parallel to the axis of said rotation, and a shoe mounted on each piston, each of said shoes having a flat surface bearing against the face of said cam plate and having a ball and socket connection with the piston on which it is mounted.

11. In a hydraulic transmission mechanism of the character described, a barrel having a plurality of piston cylinders formed therein, each cylinder being adapted to contain liquid, a plurality of pistons carried by said barrel, one in each of said cylinders, a cam plate mounted adjacent to said pistons, said barrel and cam plate being mounted for relative rotation and said cylinders extending parallel to the axis of said rotation, a plurality of members mounted on said pistons, one on each piston, and each having a surface bearing against said cam plate, each of said members having a ball and socket connection with its respective piston and having a recess formed in the surface which bears against the cam plate, communicating oil ducts extending from said recess through each member and its coöperating piston and opening into the cylinder below the piston, each recess being of an area sufficient to cause the pressure of the liquid on said member to substantially balance the pressure of the liquid in the cylinder on the end of the piston.

12. In a hydraulic transmission mechanism, the combination with a member having a piston cylinder formed therein and a piston mounted in said cylinder, of means acting on said piston to crowd it toward one side of the cylinder, said piston having a pressure recess formed therein in the side that is pressed against the cylinder, and a duct leading from said recess to the cylinder chamber below the piston, said recess being of sufficient area to cause the fluid pressure on it to substantially balance the force tending to crowd the piston against the side of the cylinder.

13. In a hydraulic transmission mechanism, the combination with a rotary driven shaft and a barrel rotatable with said shaft, of a driving shaft, a pump having a part rotatable with said driving shaft and including means rotatable with said barrel, a motor operated by the fluid set in motion by said pump, and means for varying the ratio of the drive between said shafts.

14. In a hydraulic transmission mechanism, the combination with a driving shaft and a pump including a cam plate driven by said shaft, a plurality of reciprocating pistons operated by said cam plate and means intermediate said pistons and cam plate constructed and arranged to transform the rotary motion of the cam plate into reciprocating motion of the pistons solely through sliding friction, of a motor operated by the liquid set in motion by said pump and comprising another set of reciprocating pistons, means for controlling the reciprocating movement of the motor pistons, a shaft driven by said motor, said motor being constructed and arranged to enable its pistons to have their effective movement solely through sliding friction, and means for substantially neutralizing by means of liquid pressures the more important mechanical pressures between the friction surface of the parts of the mechanism.

15. In a hydraulic transmission mechanism, the combination with a member having a piston cylinder formed therein and a piston mounted in said cylinder, of means acting on said piston to crowd it toward one side of the cylinder, said piston having a series of pressure recesses formed circumferentially about its surface which slides in the cylinder, ducts leading, respectively, from said recesses to a source of oil under pressure, and means for controlling the admission of oil to said ducts to cause oil to be supplied only to the recesses on the side of the piston which is crowded against the wall of the cylinder.

16. In a hydraulic transmission mechanism, the combination with a rotary driven shaft and a barrel rotatable with said shaft, of a driving shaft, a pump having a part rotatable with said driving shaft and including means rotatable with said barrel, and a motor operated by the fluid set in motion by said pump, said motor including a plurality of pistons mounted in cylinders formed in said barrel and a cam plate coöperating with said pistons.

17. In a hydraulic transmission mechanism, the combination with a rotary driving shaft, a pump driven by said shaft, a motor operated by the fluid set in motion by said pump and a second shaft driven by said motor, said motor having cylinders extending substantially parallel to said second shaft and said pump and motor including a common element mounted for rotation with said driven shaft.

18. In a hydraulic transmission mechanism, the combination with a rotary driving shaft, a pump driven by said shaft, a motor operated by the fluid set in motion by said pump, a second shaft driven by said motor, said motor having cylinders extending substantially parallel to said second shaft and said pump and motor including parts that rotate in unison, and means for adjusting the ratio of the drive between said shafts.

In testimony whereof I have signed my name to this specification.

WILLIAM M. DAVIS.